(12) United States Patent
Zhang (10) Patent No.: US 9,373,060 B2
(45) Date of Patent: Jun. 21, 2016

(54) ELECTRONIC CARD CONNECTOR HAVING EJECTING MECHANISM

(71) Applicant: FOXCONN INTERCONNECT TECHNOLOGY LIMITED, Grand Cayman (KY)

(72) Inventor: Wei-De Zhang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/656,033

(22) Filed: Mar. 12, 2015

(65) Prior Publication Data

US 2015/0263452 A1 Sep. 17, 2015

(30) Foreign Application Priority Data

Mar. 12, 2014 (CN) .......................... 2014 1 0088588

(51) Int. Cl.
*H01R 13/62* (2006.01)
*G06K 13/08* (2006.01)

(52) U.S. Cl.
CPC ............ *G06K 13/0831* (2013.01); *H01R 13/62* (2013.01)

(58) Field of Classification Search
CPC .............. H01R 13/62; G06K 13/0831; G06K 13/0837; G06K 13/0806; G06K 13/0812; G06K 13/0818; G06K 13/0825; G06K 13/07
USPC ......................................... 439/152, 157, 630
See application file for complete search history.

(56) References Cited

U.S. PATENT DOCUMENTS

| | | | |
|---|---|---|---|
| 6,478,591 B1 | 11/2002 | Chang | |
| 6,749,448 B2 | 6/2004 | Bright et al. | |
| 6,814,597 B1 | 11/2004 | Kao | |
| 7,261,577 B1* | 8/2007 | Lai | G06K 7/0021 439/159 |
| 7,261,578 B2* | 8/2007 | Zhao | H01R 13/633 439/159 |
| 7,771,225 B1 | 8/2010 | Wu | |
| 8,414,316 B2* | 4/2013 | Zhang | G06K 7/003 439/159 |
| 9,236,692 B2* | 1/2016 | Yamanaka | G06K 13/0831 439/153 |
| 2010/0227489 A1* | 9/2010 | Yu | H01R 13/635 439/153 |
| 2013/0196523 A1* | 8/2013 | Lim | H01R 13/6335 439/153 |
| 2014/0206212 A1* | 7/2014 | Lee | G06K 13/0812 439/153 |

FOREIGN PATENT DOCUMENTS

| | | |
|---|---|---|
| TW | M432992 | 6/2012 |
| TW | M454643 | 6/2013 |

* cited by examiner

*Primary Examiner* — Abdullah Riyami
*Assistant Examiner* — Harshad Patel
(74) *Attorney, Agent, or Firm* — Ming Chieh Chang; Wei Te Chung (57) ABSTRACT

An electronic card connector (100) includes an insulative housing (1), a number of terminals (2) retained in the insulative housing, a movable component movable between an original position and a locking position, a shielding shell (4) attached to the insulative housing and having a top wall (41) and a first elastic portion (43) located at the top wall, and an ejecting mechanism (5). The ejecting mechanism has a lever (51) having a resisting part (5111) and a sliding bulge (54) movable together with the movable component. The first elastic portion has a locking part (431) resisting against the sliding bulge along an up-to-down direction at the locking position and a guiding part (432). The lever is movable forwardly and the resisting part is guided by the guiding part to lift the first elastic portion to thereby disengage the locking part from the sliding bulge.

14 Claims, 10 Drawing Sheets

ELECTRONIC CARD CONNECTOR HAVING EJECTING MECHANISM

BACKGROUND OF THE INVENTION

1. Field of the Invention

The present invention relates generally to an electronic card connector, and more particularly to an electronic card connector having an ejecting mechanism.

2. Description of Related Arts

Taiwan Patent No. M454643 discloses an electronic card connector including a housing defining a cavity, a cam pivoting at the front of the housing, and a lever connecting with the cam. The cam is driven by the electronic card to rotate clockwise and the lever is driven to withdraw along a contact direction perpendicular to a card-inserting direction to lock the electronic card in a card-inserting process. The lever is driven along a card-inserting direction to release the electronic card to drive the cam to rotate anticlockwise in a card-withdrawn process.

U.S. Pat. No. 6,478,591 discloses an electronic card connector having an ejector designed for working with a card and a shell. The ejector comprises a slider block, an elastic element, a push bar, and an elastic piece. When the card is inserted into the connector, the slider block is pushed inwardly until it is engaged by the elastic piece. To eject the card, the push bar is manually pushed inwardly. The push bar gradually forces the elastic piece away from the slider block.

An electronic card connector having an improved ejecting mechanism is desired.

SUMMARY OF THE INVENTION

Accordingly, an object of the present invention is to provide an electronic card connector having an ejecting mechanism to attain efficient and safe locking and ejection.

To achieve the above object, an electronic card connector comprising: an insulative housing defining a receiving cavity; a plurality of terminals retained in the insulative housing; a movable component received in the receiving cavity and movable between an original position and a locking position; an ejecting mechanism having a lever having a concaved hole, a sliding bulge movable together with the movable component, and a spring confined between the insulative housing and the sliding bulge, the lever having a resisting part; and a shielding shell attached to the insulative housing and having a top wall and a first elastic portion formed in the top wall, the first elastic portion having a locking part resisting against the sliding bulge along an up-to-down direction at the locking position and a guiding part located at the back of the locking part, the lever being movable forwardly and the resisting part guided by the guiding part to lift the first elastic portion to thereby disengage the locking part from the sliding bulge.

DETAILED DESCRIPTION OF THE PREFERRED EMBODIMENT

Reference will now be made in detail to the preferred embodiment of the present invention.

Referring to FIGS. 1 to 10, an electronic card connector 100 of the present invention includes an insulative housing 1, a plurality of terminals 2 and a metal sheet 6 affixed to the insulative housing 1, a tray 5 for receiving/accompanying an electronic card 200, a shielding shell 4 attached to the insulative housing 1 and defining a receiving cavity 10 therebetween, and an ejecting mechanism 5 located in the insulative housing 1 and received in the receiving cavity 10. The electronic card connector 100 defines a card-inserting direction, a front end and a rear end referring to FIG. 1.

The insulative housing 1 includes a base portion 11 defining a sliding groove 111.

The terminals 2 are located in two rows and received in the base portion 11. Each terminal 2 includes a soldering portion 21, an affixed portion 22 retained in the insulative housing 1 and a contacting portion 23 rising into the receiving cavity 10.

The metal sheet 6 is located in two sides of the terminals 2 and is formed with a side board 61 forming the receiving cavity 10 with the insulative housing 1.

The tray 3 is formed as a rectangle frame and has a locking groove 31 located at the side thereof.

Figure 10:
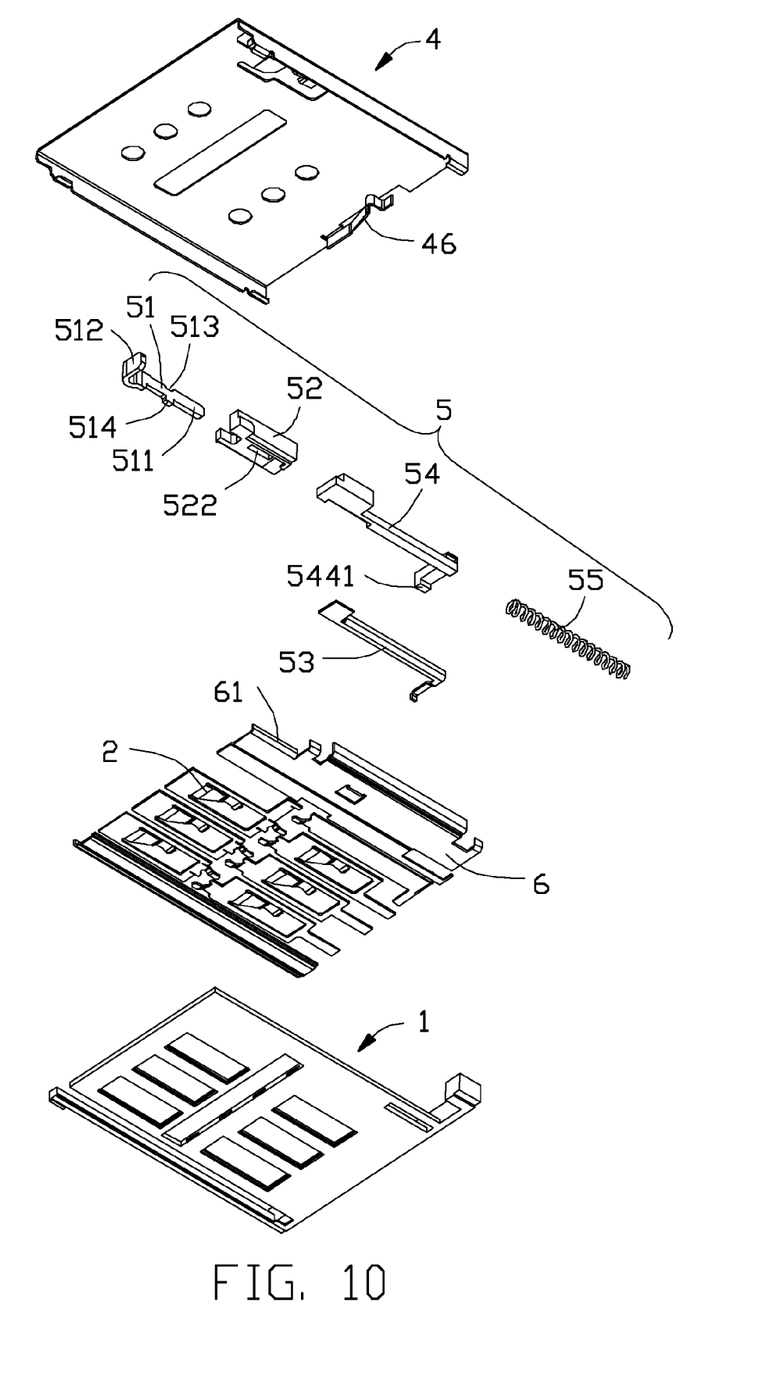
FIG. 10 is a perspective, exploded view of the shielding shell, insulative housing, metal sheet, and the ejecting mechanism, taken from a different view with respect to FIG. 9.

The shielding shell 4 includes a top wall 41 and a pair of side walls 42 extending downwardly from the top wall 41. The top wall 41 has an opening 45, a first elastic portion 43 located in the opening 45 and extending forwardly, and a second elastic portion 44 extending backwardly. The first elastic portion 43 includes a locking part 431 extending along a transverse direction perpendicular to the car-inserting direction and a guiding part 432 located at the back of the locking part 431 and formed as a step shaped in "Z". Referring to FIG. 10, the shielding shell 4 further has a third elastic portion 46.

The ejecting mechanism 5 is formed with a lever or pushing bar 51, a holding part 52 defining a receiving groove 521 extending along the card-inserting direction and a sliding slot 522 in the bottom thereof, a sliding bulge 54 sliding along the card-inserting direction, a metal part 53 located in the sliding bulge 54 and a spring 55. The lever 51 includes a main part 511 defining a resisting part 5111 therein, an operating part 512, a concaved hole 513 defined in the top surface of the main part 511, and a projecting rib 514 defined in the bottom surface of the main part 511. The sliding bulge 54 includes a main body 541, a protrusion 542 located at the back of the main body 541, a resisting surface 543 located at the back of the protrusion 542, and a driving portion 544 protruding to the main body 511. The driving portion 544 has a projecting portion 5441 at the bottom thereof for sliding in the sliding groove 111 of the base portion 11.

The ejecting mechanism 5 is movable between an original position and a locking position. The holding part 52 is located at the metal wall 61 of the metal sheet 6. The main part 511 of the lever 51 is received in the receiving groove 521 of the holding part 52. The projecting rib 514 is movable in the sliding slot 522 of the holding part 52 and the spring 55 is confined between the insulative housing 1 and a front edge of the sliding bulge 54.

Figure 1:
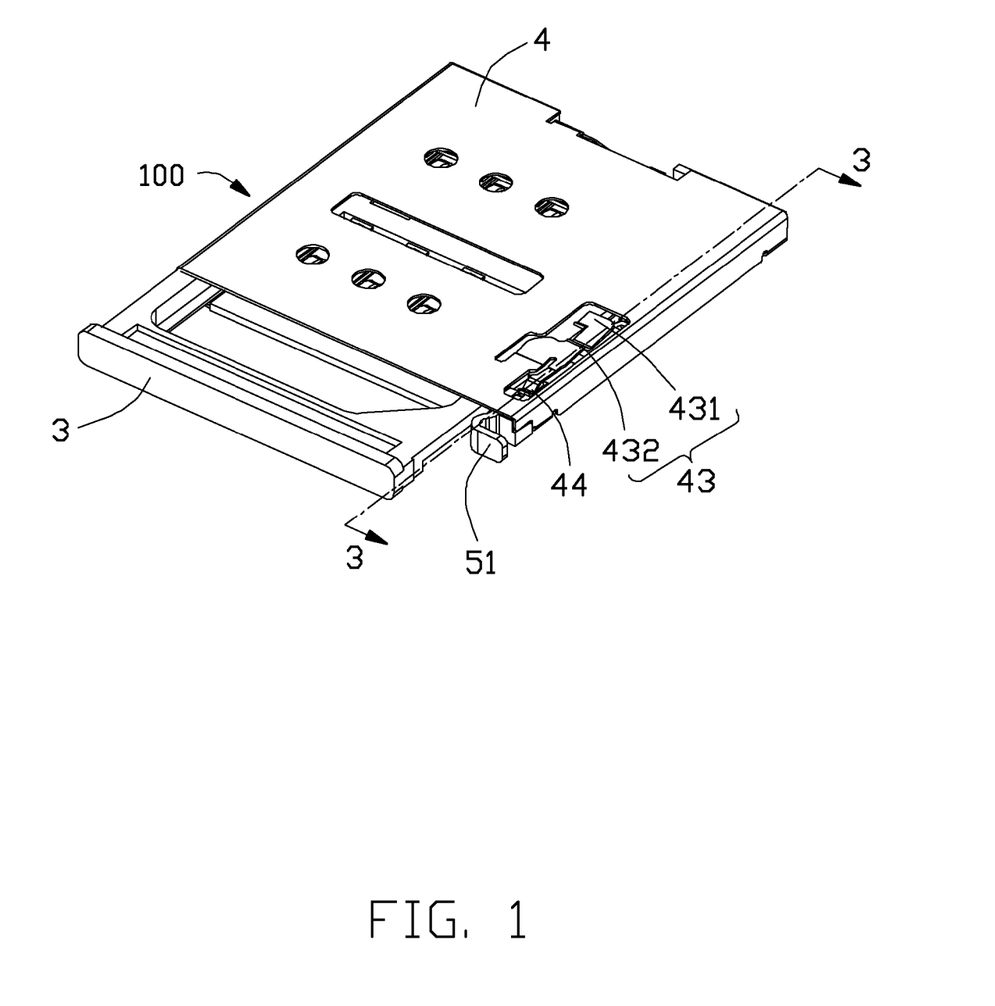
FIG. 1 is a perspective, assembled view of an electronic card connector in an original position.
Figure 2:
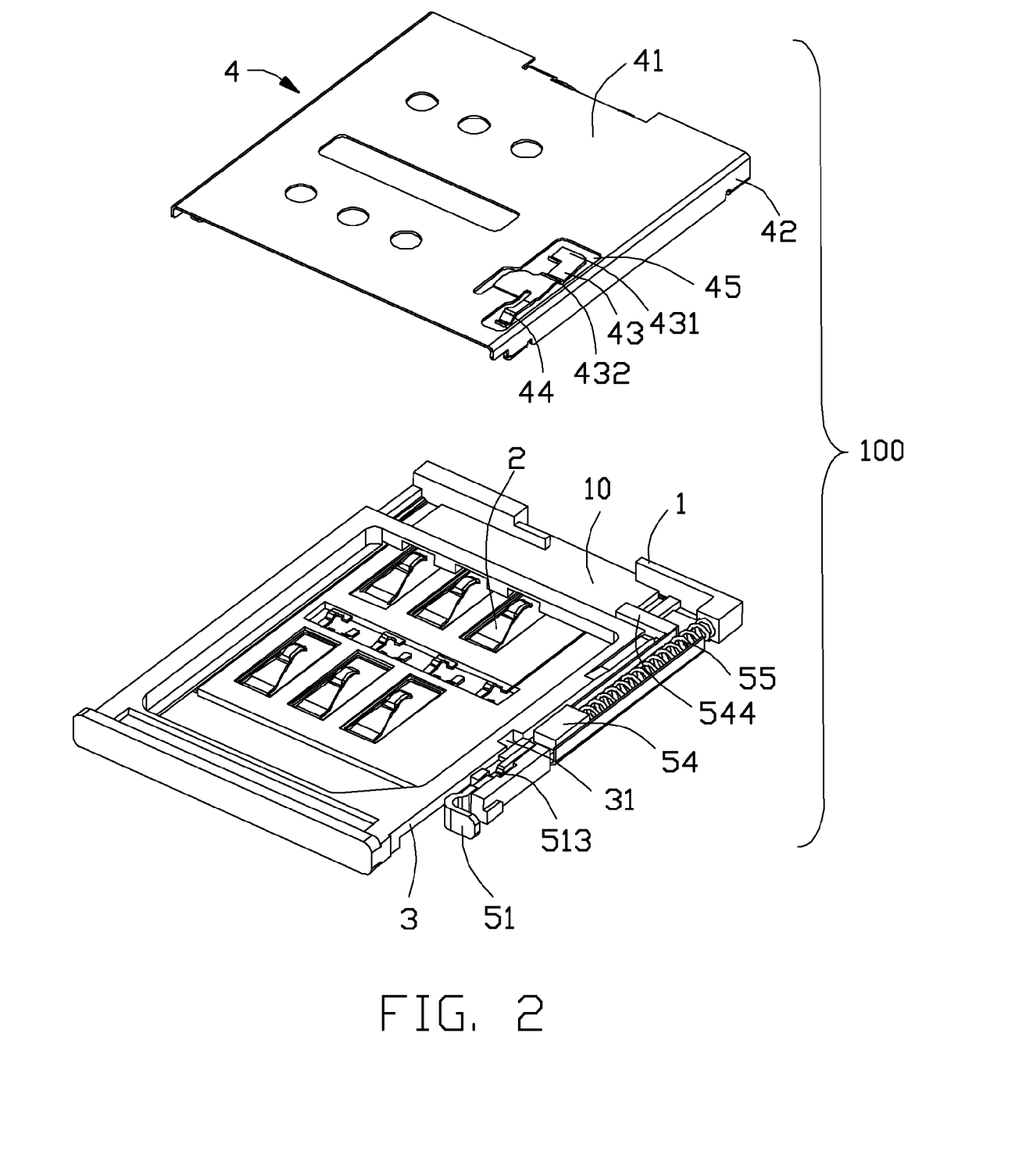
FIG. 2 is a perspective, partly exploded view of the electronic card connector in an original position with respect to FIG. 1.
Figure 3:
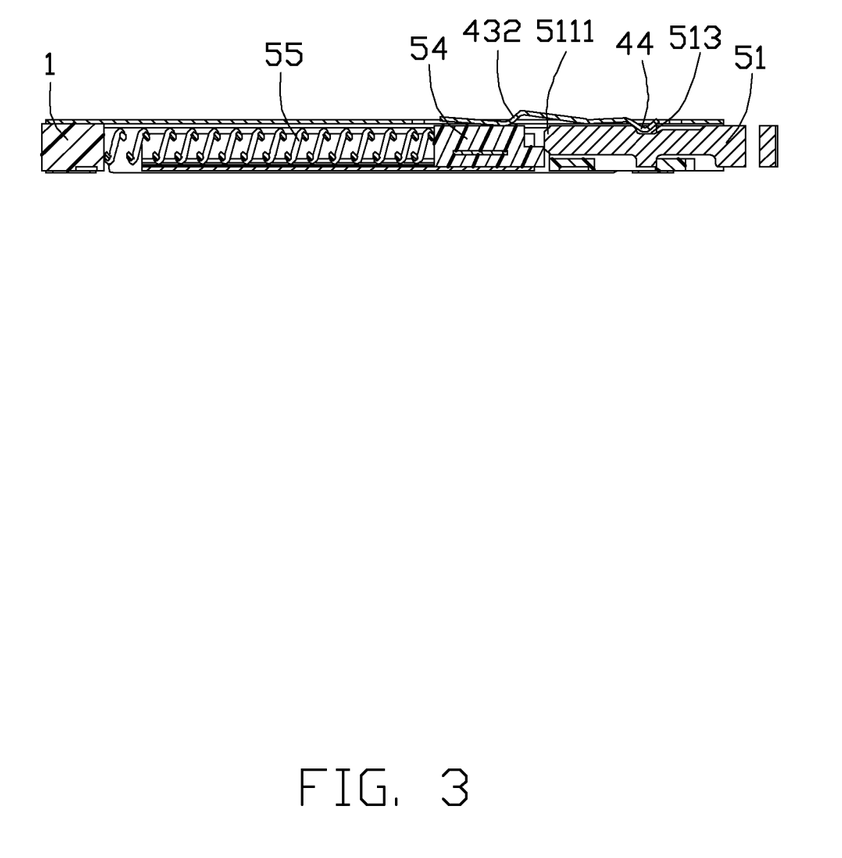
FIG. 3 is a cross-sectional view of the electronic card connector along line 3-3 with respect to FIG. 1.

FIGS. 1 to 3 show the tray 3 inserted forwardly into the receiving cavity 10 from the original position. The driving position 544 is resisted against by a front edge of the tray 3. The second elastic portion 44 is locked in the concaved hole 513 of the lever 51 51.

Figure 4:
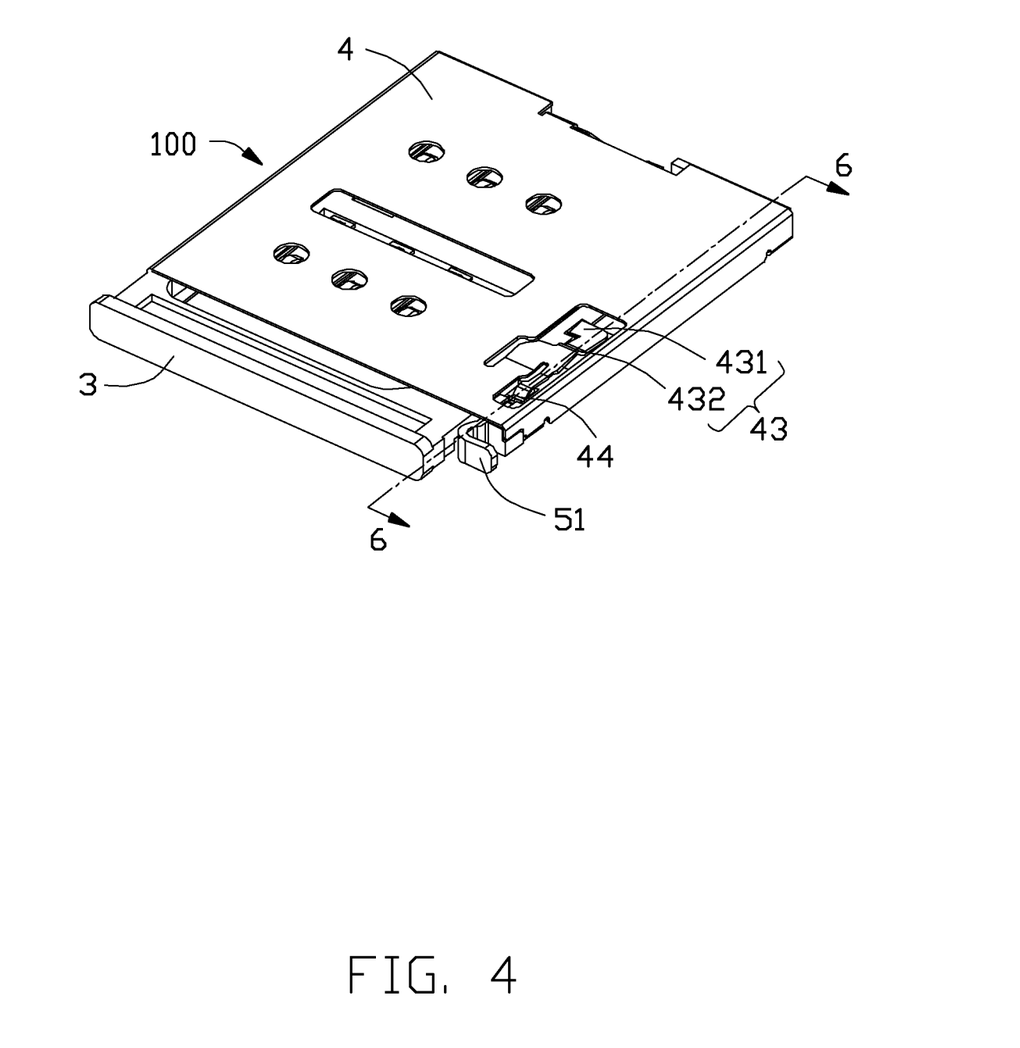
FIG. 4 is a perspective, exploded view of the electronic card connector in a locking position.
Figure 5:
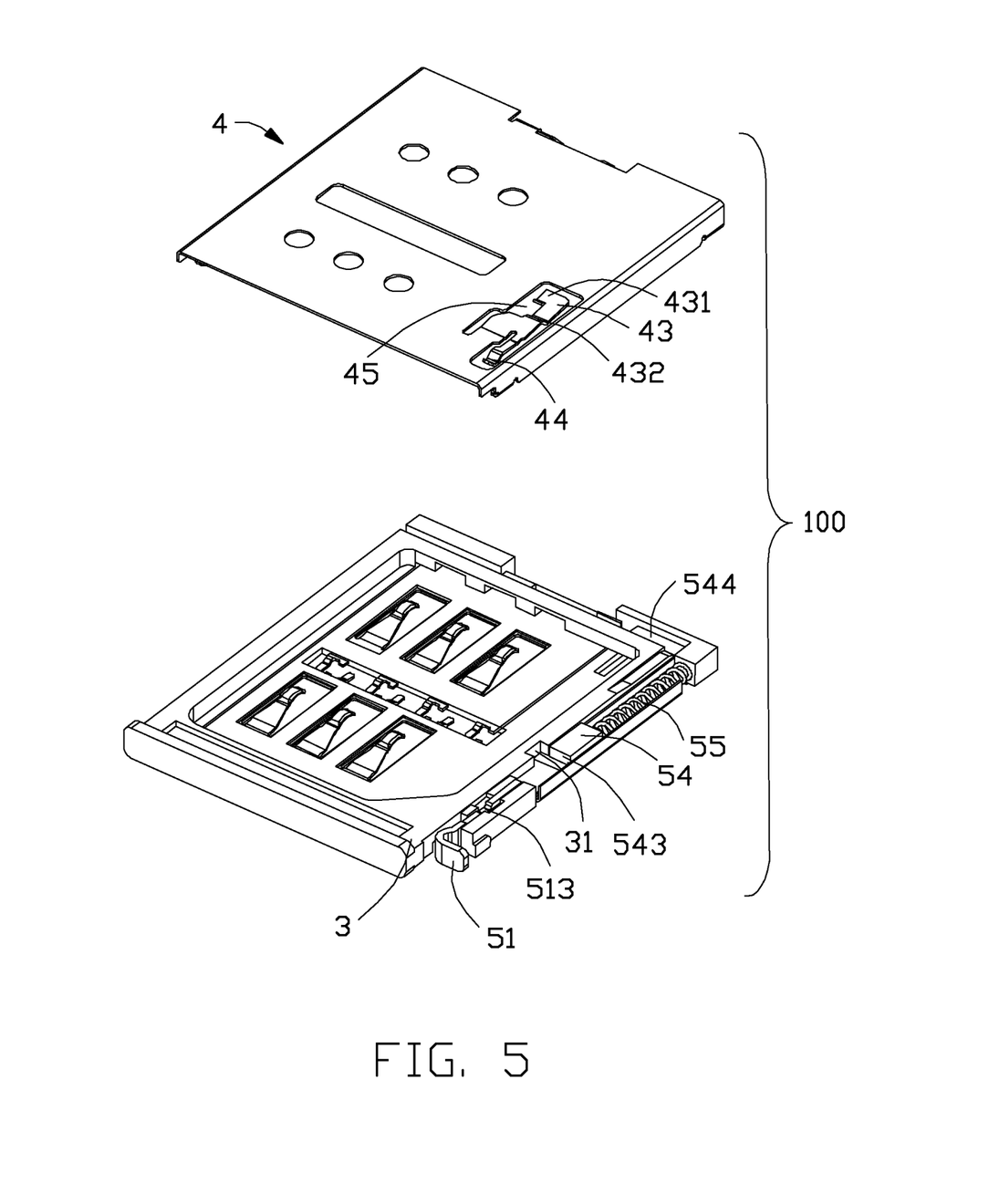
FIG. 5 is a perspective, partly exploded view of the electronic card connector in a locking position with respect to FIG. 4.
Figure 6:
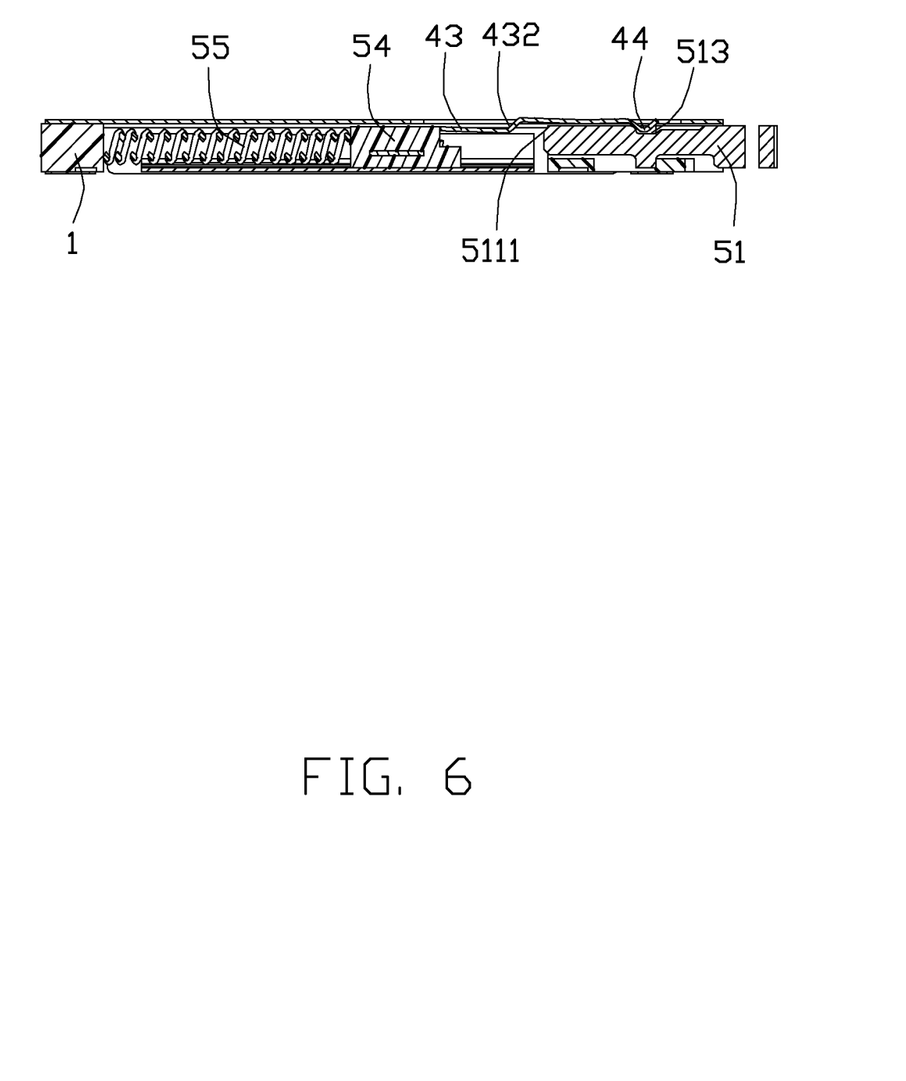
FIG. 6 is a cross-sectional view of the electronic card connector along line 6-6 with respect to FIG. 4.

FIGS. 4 to 6 show the tray 3 inserted forwardly to the locking position. The tray 3 together with the driving portion 544 is pushed forwardly to the locking position. A side part of the locking part 431 of the first elastic portion 43 is locked in the locking groove 31 of the tray 3, and a front part is resisted against by a rear part of the resisting surface 543 of the sliding bulge 54 along a up-to-down direction to avoid the protrusion 542 turning back. The third elastic portion 46 is resiliently located at a front edge of the tray 3 and the spring 55 is compressed.

Figure 7:
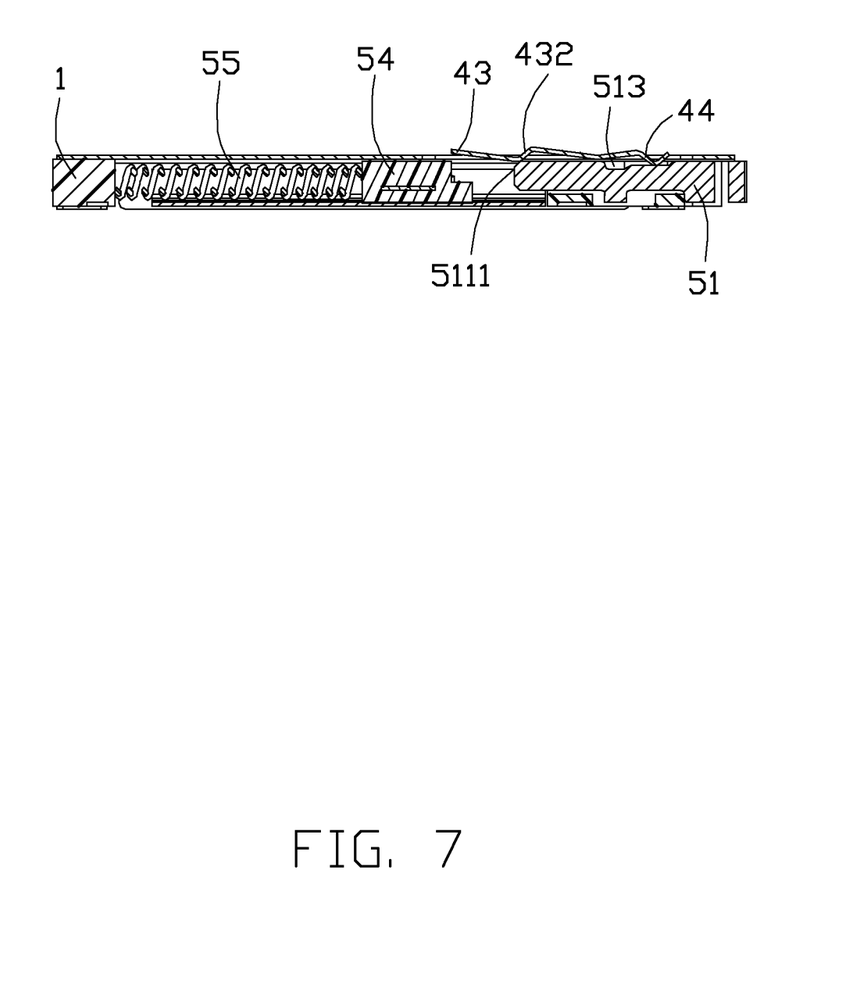
FIG. 7 is a cross-sectional view of the electronic card connector when the lever is driven forwardly to release the electronic card.
Figure 8:
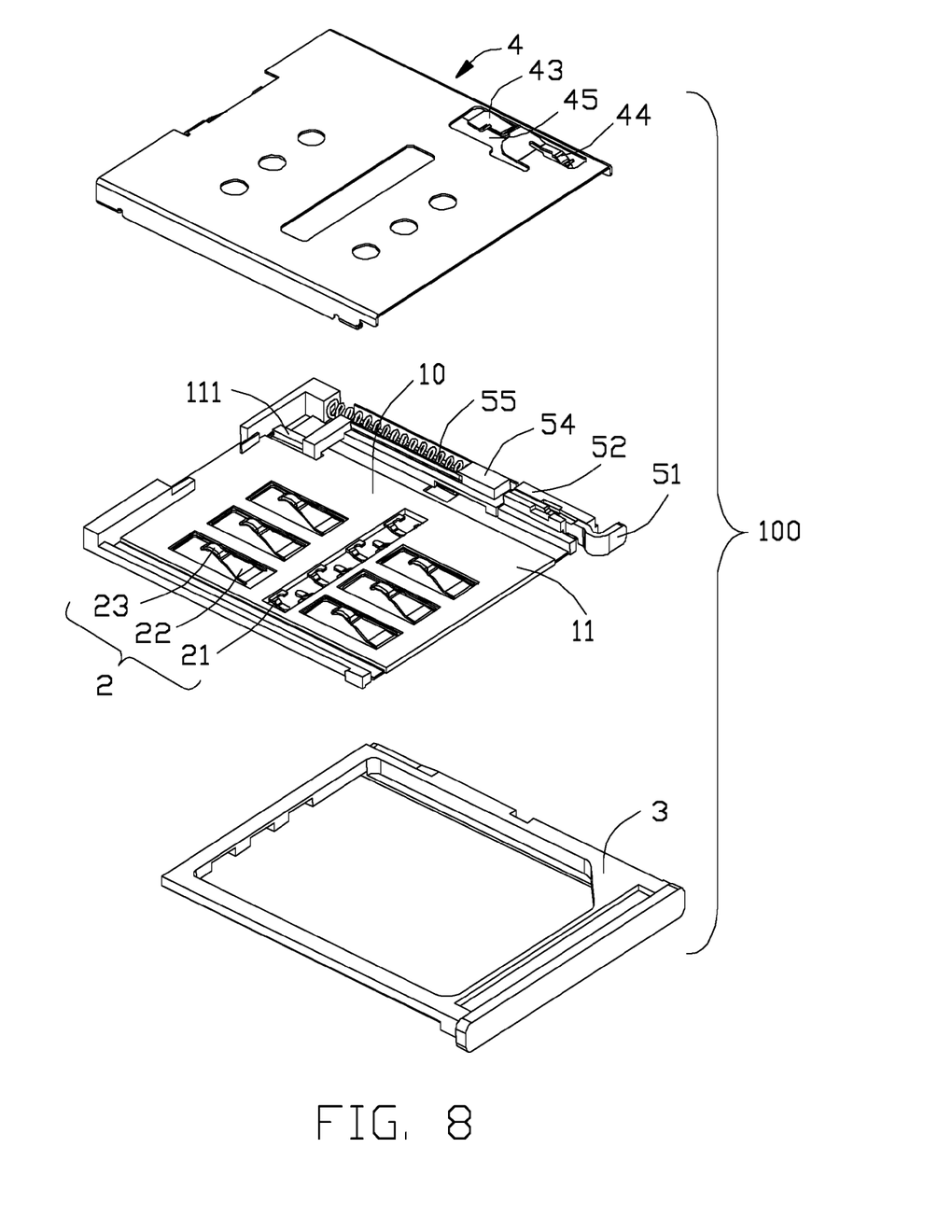
FIG. 8 is a further perspective, partly exploded view of the electronic card connector with respect to FIG. 2.
Figure 9:
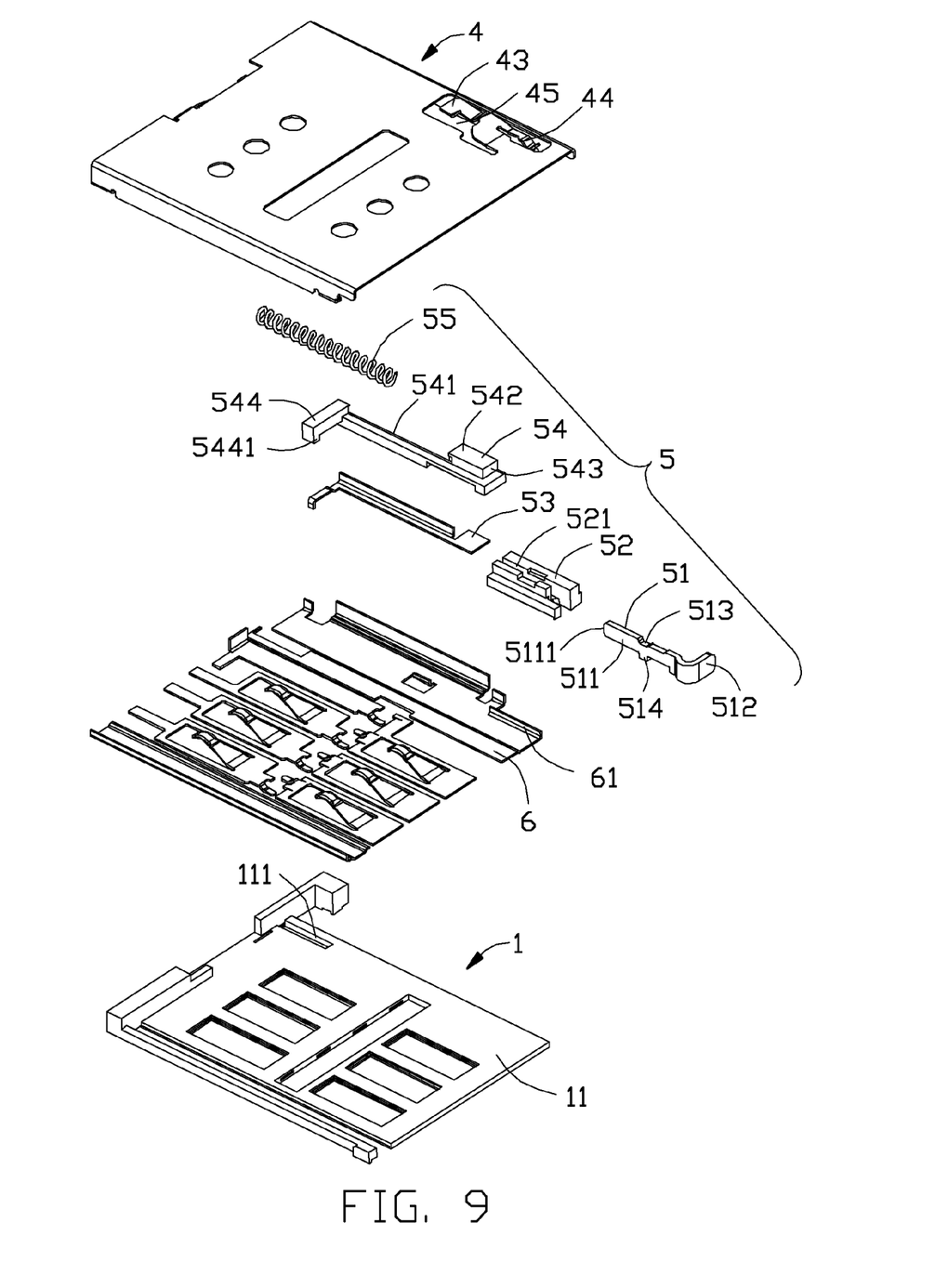
FIG. 9 is a perspective, exploded view of the shielding shell, insulative housing, metal sheet, and the ejecting mechanism.

FIG. 7 shows that the tray 3 is ejected. Referring to FIGS. 8 to 10, the operating part 512 of the lever 51 is pushed forwardly, and the projecting rib 514 is movable in the sliding slot 522 of the holding part 52. The lever 51 moves forwardly to separate the second elastic portion 44 from the concaved hole 513. The resisting part 5111 of the lever 51 moves forwardly along the guiding part 432 of the first elastic portion 43 to lift the first elastic portion 43. The side part of the locking part 431 of the first elastic portion 43 is separated from the locking groove 31 upwardly, and the front part of the sliding bulge 54 is separated from the resisting surface 543. The sliding bulge 54 is relieved by the restoring force of the spring 55 to drive the tray 3 back to the original position.

The lever 51 in this embodiment is short and equal to the length of the spring 55 minus that of the protrusion 542. In card-inserting and card-ejecting process, the spatial displacement of the lever 51 in this embodiment is equal to the distance between the front edge of the first elastic portion 43 and the rear edge of the second elastic portion 44 minus that between the resisting part 5111 and the concaved hole 513. It is easy and convenient for the lever 51 to move a little distance to insert or eject the tray 3.

In other embodiment, the tray 3 is capable to be replaced by an electronic card. The tray 3 or the electronic card is viewed as a movable component. The holding part 52 is fixed to the insulative housing 1 by the metal wall 61 of the metal sheet 6 or insert-molding with the insulative housing 1. The spring 55 is confined between the insulative housing 1 and the sliding bulge 54. In another word, the spring 55 is defined between the insulative housing 1 and the sliding bulge 54, or between other components of the insulative housing 1 and the sliding bulge 54.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector comprising:
an insulative housing defining a receiving cavity;
a plurality of terminals retained in the insulative housing;
a movable component received in the receiving cavity and movable between an original position and a locking position;
an ejecting mechanism having a lever having a concaved hole, a sliding bulge movable together with the movable component, and a spring confined between the insulative housing and the sliding bulge, the lever having a resisting part;
a shielding shell attached to the insulative housing and having a top wall and a first elastic portion formed in the top wall, the first elastic portion having a locking part resisting against the sliding bulge along an up-to-down direction at the locking position and a guiding part located at the back of the locking part, the lever being movable forwardly and the resisting part guided by the guiding part to lift the first elastic portion to thereby disengage the locking part from the sliding bulge; said movable component has a locking groove, the sliding bulge has a resisting surface and a driving portion cooperated with the movable component, the movable component together with the sliding bulge is pushed forwardly to the locking position, and the locking part resists the resisting surface of the sliding bulge and locks the locking groove of the movable component at the locking position; and wherein said shielding shell has a second elastic portion located at the back of the first elastic portion, and the lever has a concaved hole receiving the second elastic portion at the original position.

2. The electronic card connector as claimed in claim 1, wherein said ejecting mechanism has a holding part retained in the insulative housing, and the lever has an operating part and a main part fixed to the holding part and movable along a card-inserting direction.

3. The electronic card connector as claimed in claim 2, wherein said holding part has a receiving groove receiving the main part slidable therein and a sliding slot communicating with the receiving groove, and the main part has a projecting rib slidable in the sliding slot.

4. The electronic card connector as claimed in claim 1, wherein said sliding bulge has a main body and a resisting part located at the back of the main body, the driving portion projects laterally from the main part, and the resisting surface is formed at the back of a protrusion.

5. The electronic card connector as claimed in claim 1, wherein the movable component is a tray for receiving an electronic card.

6. The electronic card connector as claimed in claim 1, wherein said shielding shell has a third elastic portion in a front edge thereof, and the third elastic portion is resiliently resisted against by the front part of the movable component at the locking position.

7. The electronic card connector as claimed in claim 1, wherein the lever has a concaved hole, and the spatial displacement of the lever is equal to the distance between the front edge of the first elastic portion and the rear edge of the second elastic portion minus the distance between the resisting part and the concaved hole from the original position to a final position.

8. An electronic card connector comprising:
an insulative housing defining a tray receiving space;
a plurality of contacts disposed in the housing with contacting sections extending into the tray receiving space;

a tray received within the tray receiving space and moveable along a front-to-back direction;

a releasable locking part engageable with a lateral side of the tray;

a sliding bulge located by said lateral side, moveable along the front-to-back direction and confronting said tray in said front-to-back direction;

a spring constantly urging the sliding bulge forwardly; and a pushing bar unit discrete from and located behind and confronting the sliding bulge in the front-to-back direction; wherein when the tray can be locked by the locking part in the tray receiving space and can be ejected forwardly and outwardly by rearward movement of the pushing bar unit which successively disengages the locking part from the tray; and a metallic shell assembled to the housing to shield the tray receiving space in a vertical direction perpendicular to said front-to-back direction; and said locking part is unitarily formed with the shell.

9. The electronic card connector as claimed in claim 8, wherein said metallic shell further includes means to retain the pushing bar unit in position.

10. The electronic card connector as claimed in claim 8, wherein said locking part is deflectable in a vertical direction perpendicular to said front-to-back direction.

11. The electronic card connector as claimed in claim 8, wherein said pushing bar unit is moveable along the front-to-back direction.

12. An electronic card connector comprising:

an insulative housing defining a tray receiving space;

a plurality of contacts disposed in the housing with contacting sections extending into the tray receiving space;

a metallic shell secured to the housing to cover the tray receiving space in a vertical direction;

a tray received within the tray receiving space and moveable along a front-to-back direction perpendicular to said vertical direction;

a releasable locking part engageable with a lateral side of the tray;

a sliding bulge located by the tray, moveable along the front-to-back direction and confronting said tray in said front-to-back direction;

a spring constantly urging the sliding bulge forwardly; and a pushing bar unit discrete from and located behind and confronting the sliding bulge in the front-to-back direction; wherein when the tray can be locked by the locking part in the tray receiving space and can be ejected forwardly and outwardly by rearward movement of the pushing bar unit which successively disengages the locking part from the tray; wherein said locking part is unitarily formed with the shell; and wherein said locking part is moveable in the vertical direction.

13. The electronic card connector as claimed in claim 12, wherein said shell further includes means to retain the pushing bar unit in position.

14. The electronic card connector as claimed in claim 12, wherein said locking part and said sliding bulge are located by same lateral side of the tray.

\* \* \* \* \*